United States Patent
Choi et al.

(10) Patent No.: US 9,844,067 B2
(45) Date of Patent: Dec. 12, 2017

(54) BROADCASTING METHOD USING DEVICE-TO-DEVICE (D2D) COMMUNICATION IN WIRELESS COMMUNICATION SYSTEM

(71) Applicants: LG ELECTRONICS INC., Seoul (KR); RESEARCH & BUSINESS FOUNDATION SUNGKYUNKWAN UNIVERSITY, Suwon-si, Gyeonggi-do (KR)

(72) Inventors: Wan Choi, Seoul (KR); Jongyeol Ryu, Daejeon (KR); Dongin Kim, Seongnam-si (KR); Hanbyul Seo, Anyang-si (KR); Byounghoon Kim, Anyang-si (KR); Hojin Song, Daejeon (KR)

(73) Assignees: LG Electronics Inc., Seoul (KR); Research & Business Foundation Sungkyunkwan University, Suwon-si (KR)

( * ) Notice: Subject to any disclaimer, the term of this patent is extended or adjusted under 35 U.S.C. 154(b) by 61 days.

(21) Appl. No.: 14/898,620

(22) PCT Filed: Nov. 22, 2013

(86) PCT No.: PCT/KR2013/010673
§ 371 (c)(1),
(2) Date: Dec. 15, 2015

(87) PCT Pub. No.: WO2015/005540
PCT Pub. Date: Jan. 15, 2015

(65) Prior Publication Data
US 2016/0135208 A1    May 12, 2016

Related U.S. Application Data

(60) Provisional application No. 61/845,336, filed on Jul. 11, 2013, provisional application No. 61/901,443, filed on Nov. 8, 2013.

(51) Int. Cl.
*H04W 4/00* (2009.01)
*H04W 72/12* (2009.01)
(Continued)

(52) U.S. Cl.
CPC ......... *H04W 72/121* (2013.01); *H04W 24/08* (2013.01); *H04W 76/002* (2013.01); *H04W 76/023* (2013.01)

(58) Field of Classification Search
CPC ............. H04W 72/121; H04W 76/023; H04W 76/002; H04W 24/08
(Continued)

(56) References Cited

U.S. PATENT DOCUMENTS

| 2003/0147386 A1 | 8/2003 | Zhang et al. |
| 2013/0029712 A1 | 1/2013 | Shao et al. |

(Continued)

FOREIGN PATENT DOCUMENTS

KR    10-2013-0065373 A    6/2013

OTHER PUBLICATIONS

Huawei et al., "On the Support of Group Communication for LTE," 3GPP TSG RAN Meeting #60, RP-130683, Oranjestad, Aruba , Jun. 11-14, 2013, 2 pages.

(Continued)

*Primary Examiner* — Faisal Choudhury
(74) *Attorney, Agent, or Firm* — Birch, Stewart, Kolasch & Birch, LLP

(57) ABSTRACT

Disclosed is a method in which a base station (BS) transmits information to a plurality of terminals in a wireless communication system. Specifically, the method comprises the steps of: dividing the plurality of terminals into two or more groups according to a channel state of each of the BS and the plurality of terminals and a channel state between the plurality of terminals; and broadcasting the information to a first group among the two or more groups, wherein the first group transmits the information to another group among the two or more groups through D2D communication.

6 Claims, 2 Drawing Sheets

(51) Int. Cl.
*H04W 76/02* (2009.01)
*H04W 76/00* (2009.01)
*H04W 24/08* (2009.01)

(58) Field of Classification Search
USPC .......................................................... 370/329
See application file for complete search history.

(56) References Cited

U.S. PATENT DOCUMENTS

| | | | |
|---|---|---|---|
| 2013/0150061 A1 | 6/2013 | Shin et al. | |
| 2014/0247779 A1* | 9/2014 | Wei | H04W 72/087 370/329 |
| 2015/0131475 A1* | 5/2015 | Van Phan | H04W 8/26 370/254 |
| 2015/0282132 A1* | 10/2015 | Kim | H04W 8/005 370/329 |
| 2015/0319796 A1* | 11/2015 | Lu | H04B 7/2615 370/330 |
| 2015/0382365 A1* | 12/2015 | Li | H04L 5/0085 370/329 |

OTHER PUBLICATIONS

Samsung, "Design Aspects for D2D Group Communication," 3GPP TSG RAN WG1 Meeting #73, R1-131997, Fukuoka, Japan, May 20-24, 2013, 3 pages.

* cited by examiner

BROADCASTING METHOD USING DEVICE-TO-DEVICE (D2D) COMMUNICATION IN WIRELESS COMMUNICATION SYSTEM

CROSS REFERENCE TO RELATED APPLICATIONS

This application is the National Phase of PCT International Application No. PCT/KR2013/010673, filed on Nov. 22, 2013, which claims priority under 35 U.S.C. 119(e) to U.S. Provisional Application No. 61/845,336, filed on Jul. 11, 2013, and U.S. Provisional Application No. 61/901,443, filed on Nov. 8, 2013, all of which are hereby expressly incorporated by reference into the present application.

TECHNICAL FIELD

The present invention relates to a wireless communication system, and more particularly, to a method of performing broadcasting using D2D (device-to-device) communication in a wireless communication system.

BACKGROUND ART

The present invention proposes a scheme of efficiently relaying information to users of an overall system via cooperative delivery using a direct communication between terminals among the users. Before the present invention is explained, direct communication between terminals is explained. FIG. 1 is a conceptual diagram for the direct communication between terminals.

Referring to FIG. 1, a UE1 and a UE2 perform direct communication between terminals between the UE1 and the UE2 and a UE3 and a UE4 perform direct communication between terminals between the UE3 and the UE4 as well. An eNB can control a position of a time/frequency resource, transmit power and the like for performing direct communication between UEs via an appropriate control signal. Yet, if UEs are positioned at the outside of coverage of the eNB, direct communication between the UEs can be configured to be performed without the control signal of the eNB. In the following, direct communication between terminals is called D2D (device-to-device) communication.

Meanwhile, when a base station relays a given amount of information to all users in a system, a part of the users can receive a preferred amount of information in early stage with the help of a good channel state. In this case, having successfully received the information, the users can relay the information to users who have failed to successfully receive information due to relatively poor channel environment. In order to efficiently relay information, multi-users can relay the information in a manner of forming V-MIMO (virtual multiple input multiple output) via D2D communication, a base station transmits information to enable users of an overall system to efficiently receive the information in consideration of relay via D2D communication and the base station can divide the users into user groups appropriate for the D2D communication.

DISCLOSURE OF THE INVENTION

Technical Task

The present invention proposes a method of performing broadcasting using D2D communication in a wireless communication system based on the aforementioned discussion.

Technical Solution

To achieve these objects and other advantages and in accordance with the purpose of the invention, a method of transmitting information transmitted by a base station to a plurality of terminals in a wireless communication system, the method comprising: dividing a plurality of the terminals into two or more groups according to a channel state of the base station and a channel state of each of a plurality of the terminals; and broadcasting the information to a first group among the two or more groups, wherein the first group transmits the information to a different group among the two or more groups using D2D (device-to-device) communication. terminals belonging to the different group are unable to receive the information broadcasted to the first group.

In another aspect of the present invention, receiving information on a channel state among a plurality of the terminals from a plurality of the terminals. At this point, the information on the channel state among a plurality of the terminals comprises information on a threshold value of a corresponding terminal and information on indexes of one or more terminals of which a channel gain with the corresponding terminal is equal to or greater than the threshold value. Also, the threshold value is determined by the corresponding terminal.

In another aspect of the present invention, transmitting index information of a plurality of the terminals to a plurality of the terminals. At this point, the index information is determined according to the channel state of the base station and the channel state of each of a plurality of the terminals.

In another aspect of the present invention, a method of transceiving information transceived by a terminal in a wireless communication system, the method comprising: reporting information on a channel state with a plurality of different terminals to a base station; receiving the information broadcasted from the base station; and transmitting the information to a specific group consisting of at least one or more terminals among a plurality of the different terminals using D2D (device-to-device) communication, wherein terminals belonging to the specific group are unable to receive the information broadcasted from the base station. At this point, the terminal belongs to a different group rather than the specific group.

In another aspect of the present invention, the method further comprising: receiving index information on the terminal and a plurality of the different terminals. At this point, the index information is determined according to a channel state of the base station, a channel state of the terminal and a channel state of each of a plurality of the different terminals.

In another aspect of the present invention, information on a channel state with a plurality of the different terminals comprises information on a threshold value of a corresponding terminal and information on indexes of one or more terminals of which a channel gain with a plurality of the different terminals is equal to or greater than the threshold value. At this point, the method further comprising: configuring the threshold value; and measuring the channel gain with a plurality of the different terminals and comparing the channel gain and the threshold value with each other.

ADVANTAGEOUS EFFECTS

According to embodiments of the present invention, it is able to efficiently transmit a signal using D2D communication in a wireless communication system.

Effects obtainable from the present invention may be non-limited by the above mentioned effect. And, other unmentioned effects can be clearly understood from the following description by those having ordinary skill in the technical field to which the present invention pertains.

BEST MODE

Mode for Invention

Figure 1:
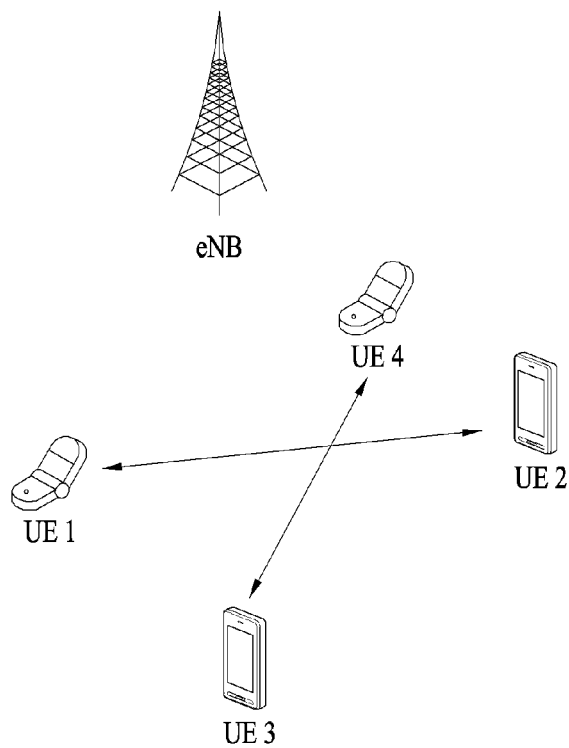
FIG. 1 is a conceptual diagram for D2D communication.
Figure 2:
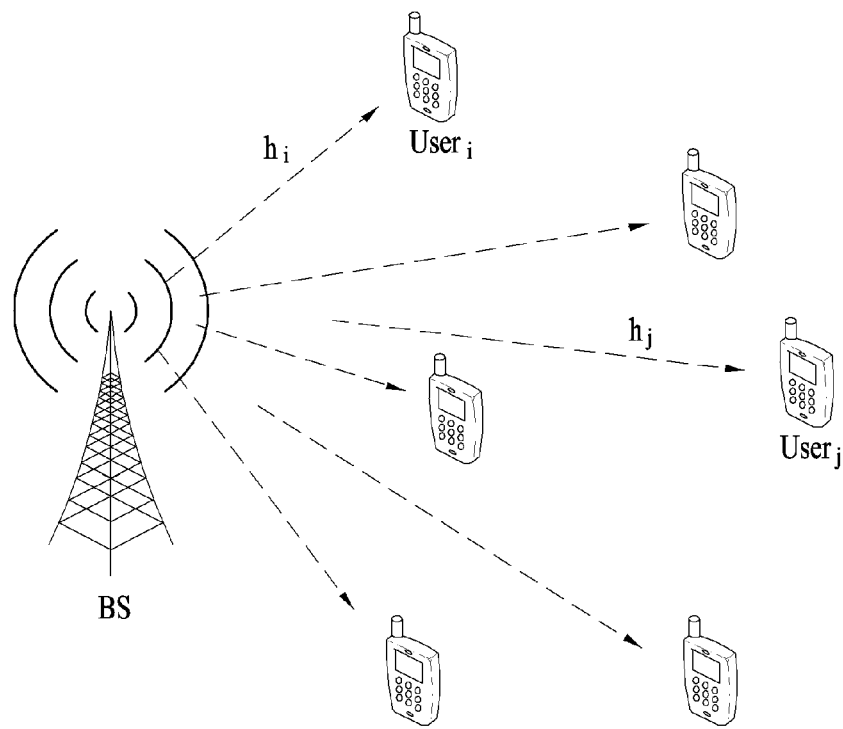
FIG. 2 is a conceptual diagram for multi-user multicasting environment between K number of users and a base station.

First of all, it may be able to consider multi-user multicasting environment that common information is received from a base station in downlink. FIG. 2 is a conceptual diagram for multi-user multicasting environment between K number of users and a base station. In particular, assume that both a base station and users are respectively equipped with a single antenna in FIG. 2. An object of the multi-user multicasting environment is that all users in a system receive a given amount of information corresponding to B bits.

Referring to FIG. 2, a base station transmits information using maximum power $P_T$ to enable all users to achieve information amount as soon as possible. An information amount received by an $i^{th}$ user per unit time can be represented as Equation 1 in the following.

$$R_i = \log(1 + |h_i|^2 \rho_t) \quad \text{[Equation 1]}$$

In Equation 1, $\rho_t$ corresponds to transmission SNR (signal-to-noise ratio). In this case, if variance of noise is defined as $\sigma_i^2$, it may be able to represented as $\rho_t = P_T/\sigma_i^2$. Time $t_i$ taken for the $i^{th}$ user to receive the given amount of information B can be represented as Equation 2 in the following.

$$t_i = \frac{B}{R_i} = \frac{B}{\log(1 + |h_i|^2 \rho_t)} \quad \text{[Equation 2]}$$

Since time as much as $t_i$ is necessary for the $i^{th}$ user to receive the given amount of information B, time t taken for all users in a system to successfully receive a given amount of information can be represented as Equation 3 in the following.

$$t = \max_{i \in G} t_i \quad \text{[Equation 3]}$$

In Equation 3, G corresponds to a group of all users in a system. Time t necessary for all users to receive information amount can be represented again as Equation 4 in the following using the aforementioned $t_i$.

$$t = \max_{i \in G} \frac{B}{\log(1 + |h_i|^2 \rho_t)} = \frac{B}{\log\left(1 + \min_{i \in G} |h_i|^2 \rho_t\right)} \quad \text{[Equation 4]}$$

Consequently, as shown in Equation 4, the time t is determined by time necessary for a user of poorest channel environment among users in a system to achieve the given amount of information B.

As mentioned in the foregoing description, time t consumed for relaying information is determined depending on a user of poorest channel environment in legacy multi-user multicasting environment. Hence, if channel environment of a base station or channel environment of a specific user is not good, a considerable amount of time and energy are consumed and information relaying efficiency is considerably reduced. In case of environment nearly impossible to relay information since a channel of the base station or a channel of the specific user is very poor, a failure of relaying information may occur. Hence, in case of a multicasting scheme not considering a legacy D2D cooperative relay, there exists a demerit in that efficiency and stability of information relay are not secured depending on a channel state of a user.

The present invention considers an efficient information relaying scheme using D2D cooperative transmission in multicasting environment in which multiple users exist. The present invention mainly consists of two phases. Similar to a legacy scheme, a first phase corresponds to a phase that a base station multicasts information. As a D2D information relaying phase, another phase corresponds to a phase that users relay information to the rest of users via D2D communication. Regarding this, it shall be explained with reference to drawings in the following.

Figure 3:
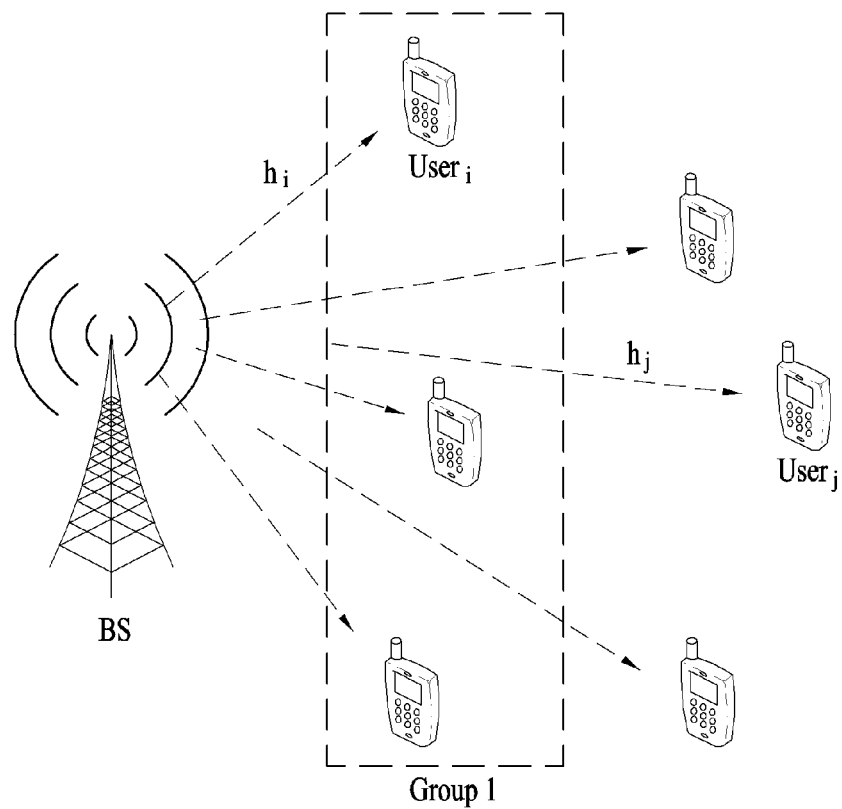
FIGS. 3 and 4 are diagrams for explaining a D2D cooperative transmission scheme according to embodiments of the present invention.
Figure 4:
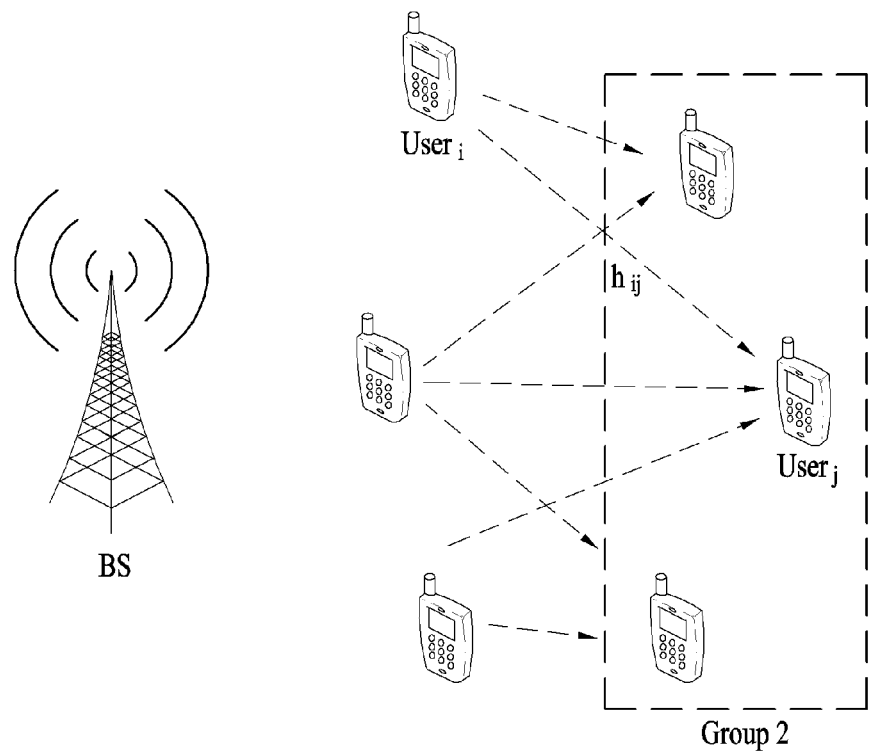

FIGS. 3 and 4 are diagrams for explaining a D2D cooperative transmission scheme according to embodiments of the present invention.

First of all, referring to FIG. 3, similar to a legacy scheme, a base station multicasts information. In particular, in the present invention, a source of multicasting is not limited by the base station. A specific D2D user may become the source of multicasting as well in consideration of communication environment between D2D users. In this phase, a group of users successfully received information amount B is defined as G1.

Subsequently, referring to FIG. 4, having successfully received the information amount B, the users of the G1 relay the information to the rest of users via D2D communication in a D2D information relaying phase. In this case, a group of the rest of the users is defined as G2. If the users of the G1 relay information via V-MIMO and all users of the G2 successfully receive the information, the D2D information relaying phase is terminated.

In the following, operations of a multicasting scheme using D2D communication are explained in detail.

1) Multicasting Phase

As shown in FIG. 3, a base station multicasts information including an information amount of B bits to the K number of users in a multicasting phase. In this case, in order to maximize transmission efficiency, the base station transmits the information using maximum power $P_T$. In case of environment that a base station is equipped with multiple antennas, it may be able to apply an efficient precoding scheme or a beamforming scheme appropriate for multicasting environment.

If time consumed for the multicasting phase corresponds to $t_1$, an information amount capable of being obtained by an $i^{th}$ user in the multicasting phase can be represented as Equation 5 in the following.

$$\tau_i^{1st} = t_1 \log(1 + |h_i|^2 \rho_t) \quad \text{[Equation 5]}$$

In Equation 5, $\rho_t$ corresponds to transmission SNR. In this case, if variance of noise is defined as $\sigma_i^2$, it may be able to represented as $\rho_t = P_T/\sigma_i^2$. shown in Equation 6 in the following, if all users belonging to the G1 successfully obtain an information amount of B bits, the multicasting phase is terminated.

$$\tau_i^{1st} \geq B, \forall i \in G1 \quad [\text{Equation 6}]$$

2) D2D Information Relaying Phase (D2D Relaying Phase)

After the multicasting phase is terminated, as shown in FIG. 4, information is relayed via a D2D phase. Having successfully received the information, the users belonging to the G1 relay the information to the rest of users belonging to the G2 in a manner of forming a V-MIMO channel using D2D communication. An efficient relaying scheme can be determined according to a channel information amount owned by the users belonging to the G1.

The present invention considers a scheme of relaying information using a DSTC (distributed space time coding) scheme in consideration of environment where information exchange between users is limitative. Yet, in the D2D information relaying phase of the present invention, it may be able to apply various D2D cooperative transmission schemes including not only the DSTC scheme but also a cooperative transmission scheme that D2D users transmit information in a manner of matching a phase of a channel only in environment where information exchange is more limitative or a cooperative transmission scheme that users transmit information via coded cooperation configured to transmit a part different from each other in the information in environment where information exchange is somewhat permitted between D2D users.

Assume a case that the users belonging to the G1 relay information using maximum power $P_i$ ($i \in G1$) of each of the users to maximize efficiency of the information relay. The users belonging to the G2 receive total information in a manner of putting an information amount directly received from a base station in the multicasting phase and an information amount relayed from the users belonging to the G1 via D2D communication together. Hence, an information amount received by a $j^{th}$ user via the multicasting phase and the D2D phase can be represented as Equation 7 in the following.

$$\tau_j^{2nd} = t_1 \log(1 + |h_j|^2 \rho_t) + t_2 \log\left(1 + |h_j|^2 \rho_t + \sum_{i \in G1} |h_{ij}|^2 \rho_{ij}\right) \quad [\text{Equation 7}]$$

In Equation 7, transmission SNR is given as $\rho_{ij} = P_i/\sigma_{ij}^2$ and $\sigma_{ij}^2$ corresponds to variance of channel noise between a user i and a user j. If the users belonging to the G2 successfully obtain an information amount of B bits as shown in Equation 8, the D2D phase is terminated.

$$\tau_j^{2nd} \geq B, \forall j \in G2 \quad [\text{Equation 8}]$$

Meanwhile, in order to maximize efficiency of a D2D communication-based multicasting scheme according to the present invention, it is necessary for a base station to efficiently divide the users belonging to the G1 from the users belonging to the G2. A method of maximizing transmission efficiency in environment where all users in a system successfully receive an information amount of B bits is to minimize time consumed for transmission. An efficient user division scheme can be represented by Equation 9 in the following.

[Equation 9]

$$\min_{G1,G2} t = t_1 + t_2 \quad (1)$$

where, $\tau_i^{1st} \geq B, \forall i \in G1$ $$\tau_j^{2nd} \geq B, \forall j \in G2 \quad (2)$$

$$|G1| + |G2| = K, \quad G1 \cap G2 = 0 \quad (3)$$

In Equation 9, (1) and (2) correspond to conditions necessary for the users belonging to the G1 and the users belonging to the G2 to receive an information amount of B bits, respectively. (3) corresponds to a condition necessary for all of the K number of users to receive the B bits.

In Equation 9, first of all, the G1 and the G2 induce time consumed for performing the multicasting phase and the D2D phase in given environment. According to the aforementioned operation scheme, minimum time consumed for the G1 and the G2 to perform the multicasting phase in given environment can be induced as shown in Equation 10 in the following.

$$t_1^* = \max_{i \in G1} \frac{B}{\log(1 + |h_i|^2 \rho_t)} = \frac{B}{\min_{i \in G1} \log(1 + |h_i|^2 \rho_t)} \quad [\text{Equation 10}]$$

According to Equation 10, it is able to know that minimum time consumed for performing the multicasting phase is determined based on time taken for a user of a poorest channel between a base station and a user among the users belonging to the G1 to receive all of the given information amount of B bits. Minimum time consumed for performing the D2D phase can be induced from the previously induced $t_1^*$ as shown in Equation 11 in the following.

$$t_1^* = \max_{i \in G1} \frac{B}{\log(1 + |h_i|^2 \rho_t)} \cdot \quad [\text{Equation 11}]$$

$$\max_{j \in G2} \left\{ \frac{\min_{i \in G1} \log(1 + |h_i|^2 \rho_t) - \log(1 + |h_j|^2 \rho_t)}{\log\left(1 + \sum_{i \in G1} |h_{ij}|^2 \rho_{ij}\right)} \right\}$$

According to Equation 11, it is able to know that the time consumed for performing the D2D phase is determined by a ratio of the remaining information amount except the information amount received in the multicasting phase among the information amount of the B bits to a transmission rate capable of being relayed via D2D communication.

Time consumed for relaying total information can be represented as Equation 12 in the following using the Equation 10 and the Equation 11 mentioned above.

$$t^* = t_1^* + t_2^* = \frac{B}{\min_{i \in G1} \log(1 + |h_i|^2 \rho_t)} \cdot \quad [\text{Equation 12}]$$

$$\left(1 + \max_{j \in G2} \left\{ \frac{\min_{i \in G1} \log(1 + |h_i|^2 \rho_t) - \log(1 + |h_j|^2 \rho_t)}{\log\left(1 + \sum_{i \in G1} |h_{ij}|^2 \rho_{ij}\right)} \right\} \right)$$

In case of using transmission time shown in the Equation 12, the Equation 9 can be represented again as Equation 13 in the following.

$$\min_{G1,G2} t^* \qquad \text{[Equation 13]}$$

$$|G1| + |G2| = K, \quad G1 \cap G2 = 0$$

In order to design an efficient user division scheme, it is necessary to exchange information with each other between a base station and users. First of all, the base station collects information of channels, which are connected with the base station, between the base station and the users and provides an index to a user according to a channel size. In this case, the base station can collect perfect channel information or partial channel information depending on a given situation.

An index corresponding to each user and indexes of users capable of helping cooperative transmission, in case that a direct channel is better than each index, are handed over to the base station via the index provided according to what is mentioned above. Hence, a user n may have total n number of user indexes ranging from 1 to n. It may be able to consider designing a user division scheme in two cases in the following according to an amount of channel information obtained by the base station.

A) First of all, it may consider environment that the base station is perfectly aware of channel information between the base station and users and channel information between the users as well. As mentioned in the foregoing description, if the base station is perfectly aware of all channel information, it is able to immediately perform user division minimizing transmission time.

As strength of a channel between a base station and a user is stronger, it is able to preferentially obtain an information amount. Hence, users of which the strength of the channel between the base station and the user is strong can sequentially belong to the G1. Hence, an optimized division scheme is selected as one finite division scheme from k number of finite division schemes as shown in Equation 14 in the following.

$$\{G_1^*, G_2^*\} \in \{\{G^{(1)}, \overline{G}^{(1)}\}, \ldots, \{G^{(k)}, \overline{G}^{(k)}\}\} \qquad \text{[Equation 14]}$$

In Equation 14, $G^{(k)}$ corresponds to a user group consisting of the k number of users ranging from a user 1 to a user k and $\overline{G}^{(k)}$ corresponds to a user group consisting of users remained after the $G^{(k)}$ is subtracted from the total user group. Hence, in the environment that the base station is aware of all channel information, an optimized user division scheme can be obtained through searching of k times.

B) Subsequently, it may consider more realistic environment. In an actual system, it is not easy for a base station to perfectly know all channel information. Hence, it may be able to consider a user division scheme via such a long-term statistic of a channel as a path-loss or shadowing capable of being more easily obtained compared to actual channel information.

A long-term statistic of a channel between a base station and a user i is defined as $l_i$ and a long-term statistic of a channel between the user i and a user j is defined as $l_{ij}$. Assume that the base station is aware of $l_i$ (i=1, ..., K) corresponding to long-term statistic information of all channels between the base station and users directly connected with the base station. In this case, the base station can obtain information on the $l_i$ via channel estimation or long-term feedback of the users.

As mentioned in the foregoing description, indexes of users are determined according to a size of long-term statistic of a channel. Hence, a user of biggest $|l_i|$ becomes a user 1. And, assume that a user n is aware of indexes of the n−1 number of users of which a long-term statistic is better than a long-term statistic of the user n. For example, a base station can inform each user of an index of a user having a better channel between the base station and a user better than a channel of the corresponding user based on long-term statistic information of channels between the base station and the user. Minimum time used for transmission, which is induced using the long-term statistic, can be represented as Equation 15 in the following.

$$t^l = \frac{B}{\min_{i \in G1} \log(1 + l_i \rho_t)} \cdot \qquad \text{[Equation 15]}$$

$$\left(1 + \max_{j \in G2} \left\{ \frac{\min_{i \in G1} \log(1 + l_i \rho_t) - \log(1 + l_j \rho_t)}{\log\left(1 + \sum_{i \in G1} l_{ij} \rho_{ij}\right)} \right\}\right)$$

Yet, in order to perform user division using the time calculated from the above equation, it is necessary for a base station to receive feedback on long-term statistic of all channels between users from the users. In this case, since an amount consumed for the feedback is too much and the amount of feedback exponentially increases as the number of users increases, it is unrealistic for the base station to receive the long-term feedback of all channels between the users.

Hence, the present invention proposes a scheme of efficiently dividing users through minimum feedback. As a scheme for a base station to efficiently induce transmission time via a small amount of feedback, the present invention proposes a threshold value-based feedback scheme. Specifically, each user directly designs a threshold value and makes a feedback on the threshold value designed by each user and indexes of users having a channel gain value between users exceeding the threshold value only to the base station.

For example, a user n directly designs a threshold value $\Gamma_n$ and makes a feedback on indexes of users of which a channel gain $l_{mn}$ (m=1, ..., n−1) between users exceeds the $\Gamma_n$ among the total n−1 number of users ranging from a user 1 to a user n−1 corresponding to candidates capable of providing a help via D2D communication to the base station together with the $\Gamma_n$.

The aforementioned threshold value-based feedback scheme can efficiently reduce an amount of feedback fed back to the base station. In order to enable each user to design a threshold value having an error as small as possible with a case that the base station has long-term statistic of all channels between users, as shown in Equation 16 in the following, it may be able to consider a scheme of minimizing an upper bound of transmission time $t^l$ capable of being obtained via the long-term statistic of all channels between users.

$$t^l \leq \hat{t}^l = \frac{B}{\min_{i \in G1} \log(1 + l_i \rho_t)} \cdot \qquad \text{[Equation 16]}$$

$$\left(1 + \max_{j \in G2} \left\{ \frac{\min_{i \in G1} \log(1 + l_i \rho_t) - \log(1 + l_j \rho_t)}{\log\left(1 + \sum_{i \in G1} \Gamma_j I(l_{ij} \geq \Gamma_j) \rho_{ij}\right)} \right\}\right)$$

In Equation 16, $I(l_{ij} \geq \Gamma_j)$ corresponds to an indicator function. If a long-term statistic $l_{ij}$ between users is greater than a threshold value $\Gamma_j$, the indicator function becomes 1.

Otherwise, the indicator function becomes 0. In other word, the base station calculates transmission time in a manner of assuming a channel gain value between users corresponding to a fed back index as the threshold value $\Gamma_j$ and assuming a channel gain value between users, which is not fed back since the channel gain value is smaller than the threshold value, as 0. Threshold values minimizing the upper bound can be obtained by Equation 17 described in the following.

$$\Gamma^* = \underset{\Gamma_j \geq 0}{\operatorname{argmin}} E_{G1}[\hat{t}^l - t^l] \qquad \text{[Equation 17]}$$

In Equation 17, $\Gamma$ corresponds to $[\Gamma_1, \ldots, \Gamma_j]$ and indicates a vector consisting of threshold values of all users. If threshold values obtained through the Equation 17 and indexes of users corresponding to the threshold values are fed back to the base station, the base station can divides users as shown in Equation 18 in the following.

$$\{G_1^t, G_2^t\} = \underset{G1,G2}{\operatorname{argmin}}\left(\hat{t}^{l*} \frac{B}{\min_{i \in G1} \log(1 + l_i \rho_t)} \cdot \right.$$

$$\left. \left(1 + \max_{j \in G2}\left\{\frac{\min_{i \in G1} \log(1 + l_i \rho_t) - \log(1 + l_j \rho_t)}{\log\left(1 + \sum_{i \in G1} \Gamma_j I(l_{ij} \geq \Gamma_j)\rho_{ij}\right)}\right\}\right)\right) \qquad \text{[Equation 18]}$$

As mentioned in the foregoing description, it is also able to obtain via searching of k times through Equation 18. Or, the base station determines $[\Gamma_1, \ldots, \Gamma_j]$ corresponding to a threshold value of each user in consideration of a range of D2D communication and the like and may be then able to inform users of the threshold value. In this case, each of the users can feedback indexes of which a channel gain $l_{mn}$ (m=1, . . . , n−1) between users exceeds $\Gamma_n$ only to the base station.

Meanwhile, the D2D user division scheme proposed by the present invention can be applied in various ways according to a transmission purpose in addition to minimizing time consumed for multicasting in multicasting environment. As an example, it may be able to consider a D2D user division scheme minimizing energy consumed for efficient information transmission in environment in which such a resource as transmission time and a frequency used for the multicasting phase and the D2D information transmission phase are already allocated. Similar to the previously proposed scheme, an energy minimizing user division scheme can select an optimized division scheme from the K number of finite division schemes and optimized transmit power allocation between D2D users can be induced via a simple optimization problem from the selected division scheme. A user division scheme for minimizing energy, which is consumed in environment where channel information is limitative, can also be applied in a manner of modifying the previously proposed threshold value-based feedback scheme in accordance with a given purpose. And, it may also be able to consider a D2D user division scheme for optimizing energy in consideration of reception power of D2D users in accordance with not only the consumed transmit power but also battery capacity of the D2D users.

Lastly, when a base station performs D2D cooperative transmission via user division, it may consider a synchronization scheme between users appropriate for the D2D cooperative transmission. Since the users belonging to the G1 perform cooperative transmission in a manner of forming a V-MIMO channel, the users should perform the transmission in accordance with synchronization of a receiving end of the users belonging to the G2. It may be able to consider a distributed synchronization scheme using information on a distance between each user and the base station based on a characteristic that a user relatively close to the base station relays information to a user relatively far from the base station.

First of all, assume that the base station and users have a TA (timing advance) value according to a distance between the base station and the users through a legacy estimation scheme. A TA value between the base station and a user i is defined as $TA_i$. Referring to FIG. 3, among the users belonging to the G1, a user closer to the base station is relatively far from the users belonging to the G2. On the contrary, among the users belonging to the G1, a user farther from the base station is relatively closer to the users belonging to the G2. Hence, in order to make signals transmitted by the users belonging to the G1 to be arrived at terminals belonging to the G2 at the same time, it is necessary for a user belonging to the G1 close to the base station to preferentially initiate D2D cooperative transmission. In particular, when a user of which a TA value, which is used for transmitting a signal, is small performs D2D cooperative transmission, the user preferentially initiates to transmit a signal (i.e., using a greater TA value).

As an example, the base station can hand over a TA value of a user farthest from the base station among the users belonging to the G1 to all users belonging to the G1. If the user farthest from the base station among the users belonging to the G1 corresponds to a user n, a user m belonging to the G1 has $TA_m$ corresponding to a TA value of the user m and $TA_n$ received from the base station. The user m estimates a distance between the user m and the user n using the $TA_m$ and the $TA_n$ under an assumption that the user m is positioned on a straight line between the base station and the user n. The user m transmits a signal in a manner of matching synchronization with the user n based on the estimated distance.

As an example, if the user n transmits a D2D cooperative signal at the time of t0, the user m transmits a signal at the time of t0−($TA_m$−$TA_n$). By doing so it is able to control the signal transmitted by the user m to be transmitted to the user n at the time of t0. Synchronization of a certain degree is matched using the aforementioned distributed scheme in the D2D phase and a receiving end can correct remaining synchronization of a reception signal via a cyclic prefix.

According to the present invention, if users of which a channel is relatively good among users in a system relay information to other users of which channel environment is poor using D2D communication, multicasting efficiency of the information can be enhanced. After a given amount of information is obtained by the users of which the channel is good, relaying efficiency of information can be enhanced using a D2D communication scheme via a V-MIMO channel. A base station can maximize information transmission efficiency in a manner of making all users in a system obtain all information in short time via a user division scheme optimized for the aforementioned operation using obtainable channel information.

The present invention can be extended not only to 2-hop transmission environment using two user groups only but also to more efficient M-hop information relaying environment using the M number of random groups. Moreover, it is able to find out the M number of groups maximizing information transmission efficiency of overall system and minimize time taken for performing total transmission via M-hop transmission. And, if not only users but also a base station forms a V-MIMO channel in the D2D phase and participates in delivering information, transmission time can be more reduced.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method of transmitting information by a base station to a plurality of terminals in a wireless communication system, the method comprising:
  receiving information on a channel state among a plurality of the terminals from a plurality of the terminals,
  wherein the information on the channel state among a plurality of the terminals comprises information on a threshold value for each of a plurality of the terminals and information on indexes of one or more terminals of which channel gains are equal to or greater than respective threshold values;
  dividing a plurality of the terminals into two or more groups according to a channel state of the base station and a channel state of each of a plurality of the terminals; and
  broadcasting the information to a first group among the two or more groups,
  wherein the first group transmits the information to a different group among the two or more groups using device-to-device (D2D) communication.

2. The method of claim 1, wherein terminals belonging to the different group are unable to receive the information broadcasted to the first group.

3. The method of claim 1, wherein the respective threshold values are determined by each of a plurality of the terminals.

4. A method of transceiving information by a terminal in a wireless communication system, the method comprising:
  reporting information on a channel state with a plurality of different terminals to a base station;
  wherein information on the channel state with a plurality of the different terminals comprises information on a threshold value for each of a plurality of the different terminals and information on indexes of one or more terminals of which channel gains are equal to or greater than respective threshold values;
  receiving the information broadcasted from the base station; and
  transmitting the information to a specific group consisting of at least one or more terminals among a plurality of the different terminals using device-to-device (D2D) communication,
  wherein terminals belonging to the specific group are unable to receive the information broadcasted from the base station.

5. The method of claim 4, wherein the terminal belongs to a different group rather than the specific group.

6. The method of claim 4, the method further comprising:
  configuring the threshold value; and
  measuring the channel gain with a plurality of the different terminals and comparing the channel gain and the threshold value with each other.

* * * * *